Nov. 4, 1952 W. VAN GUILDER 2,616,673
FOOD MIXER
Filed Jan. 3, 1950 6 Sheets-Sheet 1

FIG.1

INVENTOR:
WALTER VAN GUILDER
BY William C. Babcock
ATTORNEY

Nov. 4, 1952 W. VAN GUILDER 2,616,673
FOOD MIXER
Filed Jan. 3, 1950 6 Sheets-Sheet 3

INVENTOR:-
WALTER VAN GUILDER
BY *William C. Babcock*
ATTORNEY

Nov. 4, 1952  W. VAN GUILDER  2,616,673
FOOD MIXER
Filed Jan. 3, 1950  6 Sheets-Sheet 4

FIG.7

INVENTOR:-
WALTER VAN GUILDER
BY William C. Babcock ATTORNEY

Nov. 4, 1952     W. VAN GUILDER     2,616,673
FOOD MIXER Filed Jan. 3, 1950     6 Sheets-Sheet 6

INVENTOR:-
WALTER VAN GUILDER
BY *William C. Babcock*
ATTORNEY

Patented Nov. 4, 1952

2,616,673

UNITED STATES PATENT OFFICE 2,616,673

FOOD MIXER

Walter Van Guilder, River Forest, Ill., assignor to General Mills, Inc., a corporation of Delaware Application January 3, 1950, Serial No. 136,572

28 Claims. (Cl. 259—102)

The present invention relates to food mixers and particularly to improvements in household food mixers of the general type shown in the copending application of John N. Polivka and George T. Scharfenberg, Serial No. 136,571, filed January 3, 1950, and assigned to the same assignee as the present invention.

This new and improved type of food mixer includes a base, a bowl support at one end of the base, and an upright motor housing mounted at the other end of the base and having a gear casing projecting above the bowl support. The motor housing is movably mounted on the base for movement between operating and retracted positions with respect to the bowl support. In this type of mixer, the motor is mounted within the upright motor housing with the motor axis substantially vertical. Means are provided for urging the housing to retracted position, and a releasable latch is also utilized to hold the housing in operative position.

It is one object of the present invention to provide an improved food mixer in which the bowl support has novel clamping mechanism for retaining the mixing bowl firmly in position.

Another object is a food mixer in which a beater-supporting housing is normally urged from operating to retracted position and is provided with an improved releasable latch normally retaining the housing in operating position.

A further object is the provision of such a mixer in which the latch members on the base and housing are capable of relative adjustment to determine the exact operating position of the housing.

Still another object is the provision of such a mixer with adjustable stop means cooperating with the latch means to assist in determining the operating position of the mixer.

A further object is an improved connection between the bowl-clamping mechanism and the latching mechanism of such a device.

A still further object of the invention is an improved retarding or brake mechanism for controlling the movement of the housing between operating and retracted positions and for assisting in determining at least one of such positions.

Another object of the invention is an improved cover construction for an open-sided mixer casing.

A further object is an improved cover construction in which a cover-fastening means is located and arranged to provide a retaining recess for attachment of an accessory to the mixer.

Still another object is an improved mixer casing construction in which a removable cover is provided with a separate insert or cover plate and in which the cover and insert are secured to the mixer housing and casing in novel fashion.

A still further object of the invention is an improved arrangement of the speed control mechanism in a mixer of the general type described above, the speed control levers being located in the beater supporting casing which projects over the bowl support from the vertical motor housing.

Another object of the invention is the provision of an improved arrangement of parts in a food mixer, designed for simple and economical construction.

Other objects and advantages will be apparent from the following specification in which a preferred form of the invention has been described with particular reference to the accompanying drawings.

In these drawings.

Figure 1:
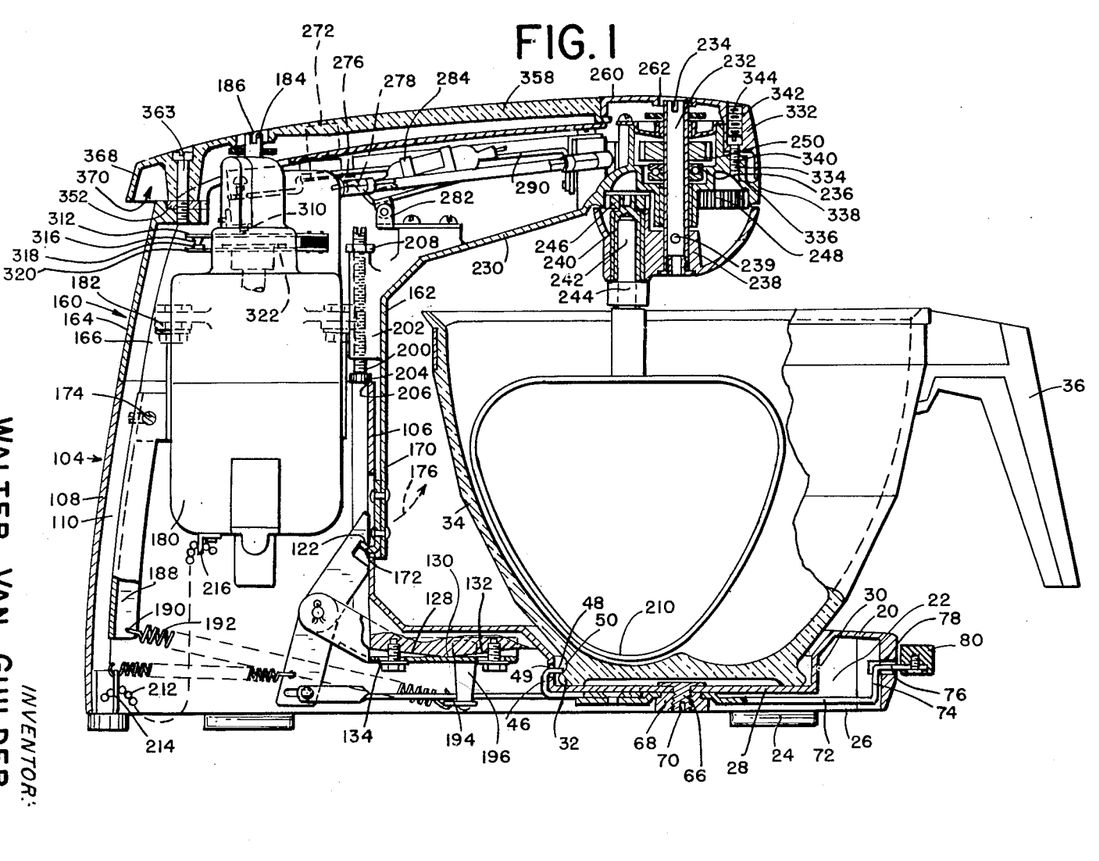
Figure 1 is a side elevation, with certain parts shown in section and certain parts broken away for clearness, showing a food mixer according to the invention.

As shown in Fig. 1, the mixer includes a base 20 provided with a depending peripheral skirt or flange 22. The base is provided with supporting legs 24 of rubber or resilient material for supporting the base 20 with its lower edge 26 spaced slightly above the table or other support in order to provide a ventilation opening beneath the peripheral edge of the base.

At one end of the base is located a bowl support, the circular bottom surface of which is indicated at 28. This bowl support is recessed below the upper surface of base 20 and includes the vertical wall portion 30 between the top of the base and the bottom 28 of the bowl support. Thus a cup-shaped or cylindrical recess is provided which is designed to accommodate the base flange 32 of a suitable mixing bowl 34. Bowl 34 may be provided with a carrying handle 36 for convenience in manipulation.

Figures 2, 3:
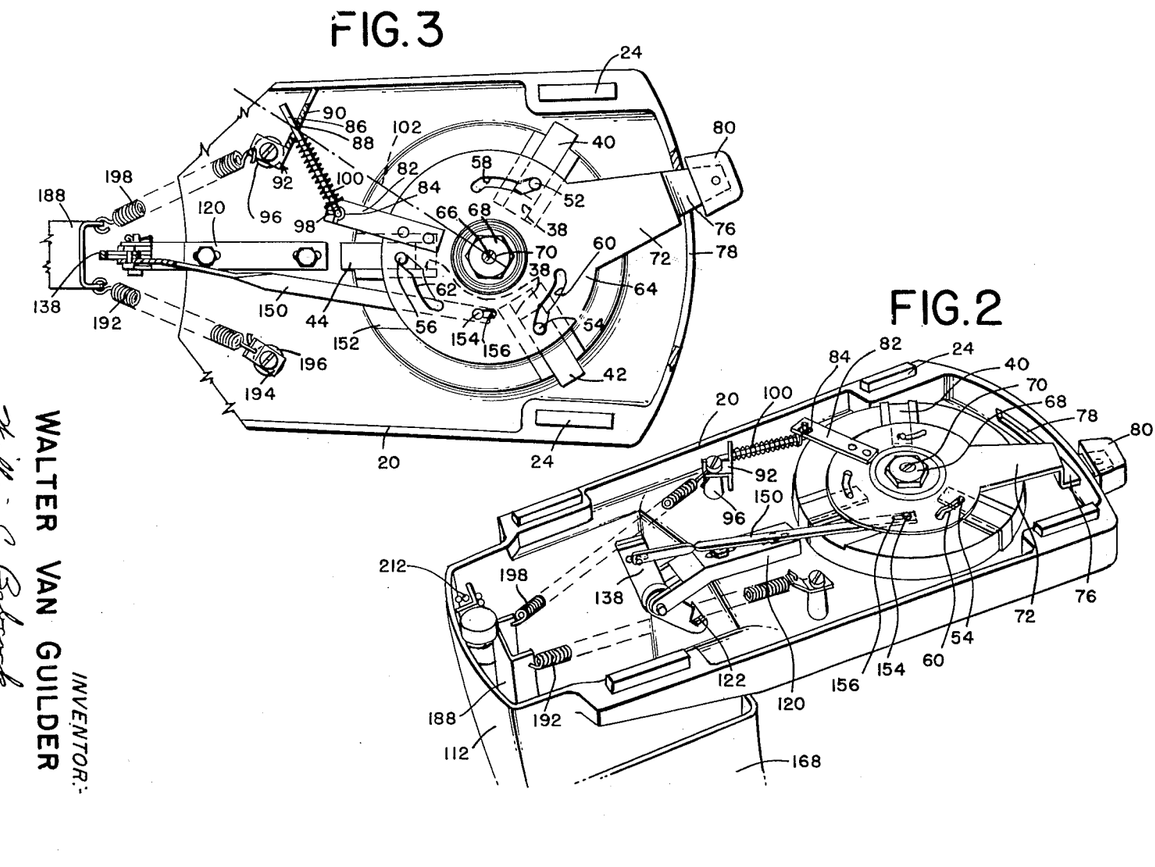
Fig. 2 is a partial perspective view of the bottom of the mixer showing details of the bowl-clamping and latch mechanism in bowl-clamping position.
Fig. 3 is a partial bottom view of the mechanism of Fig. 2 with the parts in bowl-releasing position.

As shown particularly in Figs. 2 and 3, the bottom of the base 20 beneath bowl support 28 is provided with a plurality of radial slots 38. Slidably mounted in these slots are radial clamping members 40, 42, and 44. Each of these clamping members is substantially identical in construction and clamp 44, for example, includes an upwardly extending portion 46 (Fig. 1) having a clamping hook 48 projecting inwardly through a slot 49 in the bowl support wall 30. Clamping hooks 48 are designed to engage the annular recess 50 above the lower flange 32 of the mixing bowl 34. Thus when the radially slidable clamps are moved toward the center of the bowl support the clamping hooks will firmly engage the base of the bowl and will prevent inadvertent removal or rotation of the bowl.

The clamping members 40, 42, and 44 are provided with depending pins or projections 52, 54, and 56 respectively. These pins project downwardly into cooperating cam slots 58, 60, and 62 in a rotatable control plate 64 mounted beneath the base. The control plate 64 is mounted on the vertical bolt 66 having its axis coincident with the center of the bowl and bowl support. Bolt 66 extends downwardly through the bottom 28 of the bowl support and a retaining nut 68 is threaded on the lower end of bolt 66 to hold the control plate 64 in position. A slot 70 in the lower end if the bolt 66 facilitates adjustment of the bolt and nut from the bottom of the mixer.

As shown in the drawings, the control plate 64 overlies the radial clamps 40, 42, and 44 and thus holds these clamps in the radial slots 38. Thus the single retaining nut 68 serves both to hold the control plate 64 in assembled position, and also maintains the remaining portions of the clamping mechanism in place. Slots 58, 60, and 62 extend in a substantially circumferential direction, but are angularly inclined with respect to an exact circumferential path in order that the interengagement between the slots and the respective actuating pins 52, 54, and 56 will cause the desired radial movement of clamps 40, 42, and 44.

The control plate 64 is provided with a lateral extension 72 which is upwardly offset at 74 and has a projecting end 76 extending through a slot 78 in the front skirt of the base 20. An external control knob or handle 80 is mounted on the outer end of projection 76. Manipulation of the knob 80 and of the control plate to the position shown in Fig. 2, will cause inward radial movement of the clamps 40, 42, and 44 to bowl-clamping position as shown in Fig. 1. On the other hand, movement of the control knob 80 to the opposite end of slot 78, i. e., to the position of Fig. 3, will cause the clamping members to move radially outwardly to their bowl-releasing position.

According to the present invention the bowl-clamping mechanism includes means resiliently urging the clamping mechanism to at least the bowl-clamping position. In this particular case the control plate is provided with a radial lever arm 82 having an opening in its outer end through which one end 84 of the spring-supporting rod 86 may be inserted. Rod 86, at its other end, is supported in an elongated slot 88 in one arm 90 of a bracket member 92 fastened by a bolt 94 to a threaded boss 96 on the under side of base 20. A spring locking collar 98 on downwardly projecting end 84 of rod 86 prevents disengagement of the rod end from radial lever arm 82.

A compression spring 100 is mounted on rod 86 between the bracket arm 90 and the lever 82. The location of the parts is such that spring 100 serves as an overcenter spring and resiliently urges the lever arm 82 in one direction or the other from the center line 102 between the axis if rotation of control plate 64 and the supporting slot 88 for rod 86. Thus the overcenter spring 100 will hold the parts in either the position of Fig. 2 or the position of Fig. 3 once the operator has moved the control knob 80 past the dead center position toward either of said bowl-clamping or bowl-releasing positions.

Figure 4:
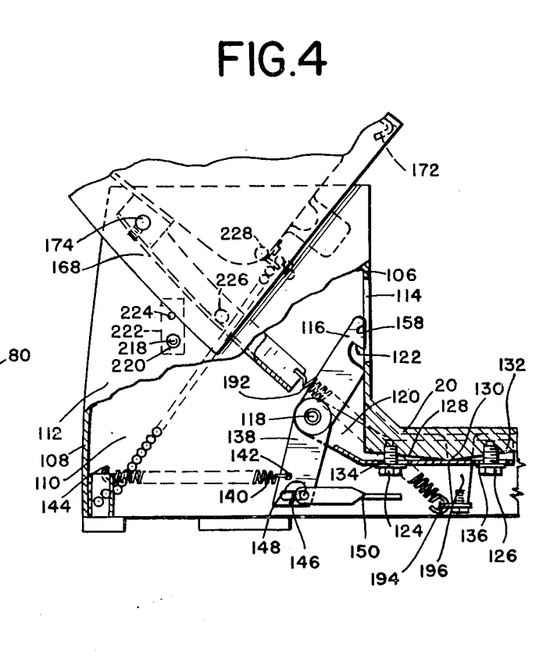
Fig. 4 is a partial side elevation, with certain parts broken away, showing the mounting of the housing for tilting movement, and also showing details of the brake or retarding mechanism which controls such movement.
Figures 5, 6:
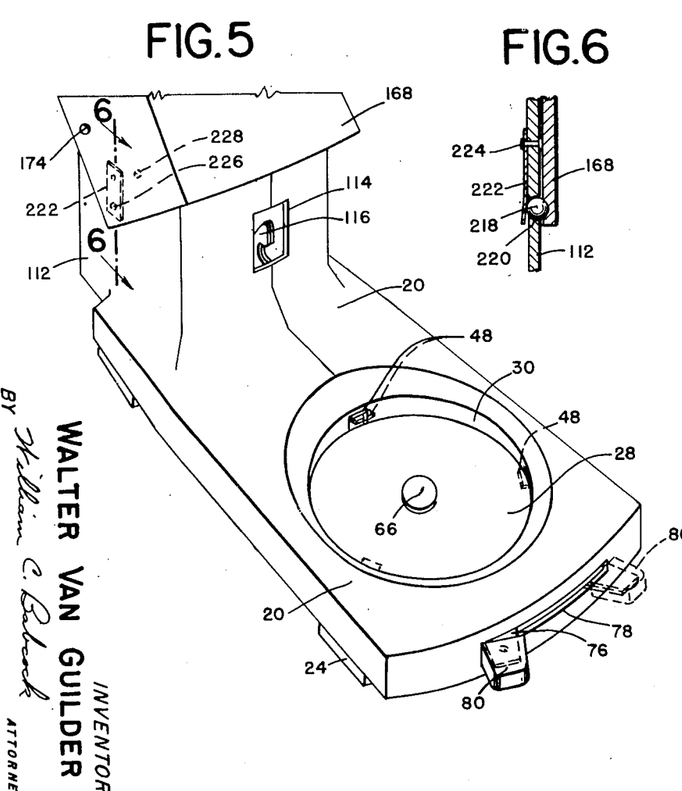
Fig. 5 is a partial front perspective of the base, bowl support, pedestal, and movable motor housing of the invention.
Fig. 6 is a partial sectional view on the line 6—6 of Fig. 5.

At the other end of base 20 opposite the bowl support 28, there is a stationary hollow pedestal 104 on which the motor housing is movably mounted. Pedestal 104 includes a front wall 106, a rear wall 108, and side walls 110 and 112 respectively (Fig. 4). Front wall 106 is provided with a latch opening 114. It will be noted that this latch opening is on the side of the pedestal facing the mixing bowl 34, i. e., facing toward what has been termed, for convenience, the "front" of the mixer.

A latch 116 is movably mounted within pedestal 104, and is pivoted at 118 to a latch support 120. The latch includes a retaining hook 122 located just inside the pedestal and in alignment with the latch opening 114.

The latch support 120 is adjustably mounted on the under side of the base 20 by means of two attaching bolts 124 and 126. The under side of base 20 is provided with a supporting seat 128 for the latch support 120. This supporting seat includes a downwardly projecting fulcrum or bearing point 130 and upwardly inclined surfaces 132 extending on each side of the fulcrum 130 toward the attaching bolts 124 and 126. Thus the bolts 124 and 126 may be adjusted to rock the latch support 120 on a horizontal axis at the bearing point 130. This rocking movement in one direction is achieved by tightening bolt 124 and loosening bolt 126, while rocking adjustment of the support in the opposite direction may be achieved by loosening bolt 124 and tightening bolt 126. This rocking adjustment of the latch support 120 may be used to move the pivot point 118 of latch 116 vertically up and down to the desired position in which the latch hook 122 will determine the operating position of the movable motor housing and beater supporting casing described below.

The latch support 120 includes longitudinal slots 134 and 136 through which the bolts 124 and 126 respectively project. The provision of these slots thus makes it possible to adjust the latch support horizontally or longitudinally in the direction of the slots. This longitudinal or sliding adjustment of the pivot point 118 also assists in determining the operative position of latch hook 122 and the housing which is held in operating position thereby.

Latch 116 includes a downwardly projecting arm 138 extending below the pivot point 118. A spring 140 is connected at one end 142 to the depending latch arm 138. The other end of spring 140 is connected at 144 to a suitable retaining bracket at the rear of the base and pedestal. Thus spring 140 normally urges latch 116 toward locking position as shown in Figs. 1 and 4.

In order to move the latch 116 to released or unlocked position, a connecting link 150 is provided. One end of connecting link 150 has a pin or rivet 148 received in a longitudinal or horizontal slot 146 in the depending arm 138 of lever 116. The other end of connecting link 150 extends in a non-radial recess 152 between the under side of base 20 and the upper surface of control plate 64 and carries a depending pin 154 engaging an eccentric opening or slot 156 in the control plate. The location and arrangement of the connecting link 150 and its respective connections to the latch 116 and control plate 64 are such that control plate opening 156 serves as a crank opening to move the connecting link longitudinally of the base in response to movement of knob 80 between bowl-clamping and bowl-releasing positions. When the clamping mechanism is moved to the bowl-clamping position of Fig. 2, the connecting link 150 is moved toward the rear of the base so that the spring 140 may hold the latch 116 in locking position. On the other hand, when the bowl-clamping mechanism is moved to the bowl-releasing position of Fig. 3, the slot 156 will engage pin 154 to move the connecting link 150 toward the front of the base and will thus rock the latch 116 on pivot 118 to its unlocked position.

The provision of slot 146 in latch arm 138 makes it possible for the latch 116 to be rocked from locked to unlocked position just sufficiently to permit the latch hook 122 to engage a corresponding latch portion of the movable housing even though the bowl-clamping mechanism is in the locked or clamping position of Fig. 2. Thus, as shown in Fig. 4, when the bowl-clamping mechanism is clamped, the pin 148 will be at the front end of slot 146. (In Fig. 4 this is illustrated in the situation where the clamping mechanism has been moved to releasing position to permit movement of the motor housing to retracted position, and the clamping mechanism has then been returned to bowl-clamping position of Fig. 2. If the housing is now returned toward operating position, the cooperating latch member on the movable housing may engage the inclined cam surface 158 at the end of latch 116 and rock the latch against the resistance of spring 140 until the latch hook 122 again snaps into position to hold the housing in operating position. This limited movement of latch 116 is permitted by the horizontal slot 146 in depending arm 138.)

Above the pedestal 104 is located the movable motor housing 160. This housing includes a front wall 162, rear wall 164, and side walls 166 and 168. The front and side walls extend downwardly and overlap the corresponding front and side walls of the pedestal 104 as shown in the drawings. Thus, in Fig. 1, the front wall 162 of the housing has a depending skirt 170 which extends in overlapping engagement downwardly along the front wall 106 of pedestal 104 so as to cover and conceal the latch opening 114 when the parts are in the position of Fig. 1. This depending skirt 170 carries the latching projection 172 which extends inwardly through latch opening 114 into engagement with the hook 122 of latch 116 to retain the housing in operating position.

In order to support the housing on the pedestal for movement between its operating and retracted positions, the parts are hinged together by means of a substantially horizontal pivot 174. As shown particularly in Figs. 1 and 4, the axis of this pivot 174 is located at the rear of pedestal 104 and housing 160 and is also located substantially higher above base 20 than the height of the latch opening 114. Thus, as the housing 160 tilts upwardly and rearwardly about its axis 174, the latch projection 172 will move upwardly and forwardly away from front wall 106 of the pedestal and into the space between said front wall and the bowl 34, as indicated by arrow 176. This arrangement and relative location of the latch mechanism and the pivot 174 makes it possible for the latch 116 and its associated parts to be located and concealed within the pedestal so that even after the skirt 170 moves upwardly, there are no latch portions projecting from the pedestal 104 for accidental engagement by the user.

Rigidly supported in the movable housing 160 is the motor or power unit 180 which is held in position by bolts 182 engaging suitable flanges on the motor 180 and housing 160. The motor shaft 184 is substantially vertical and is provided at its upper end with a driving slot 186 or other connecting means by which a suitable accessory may be directly driven.

The housing 160 includes a depending lever arm 188, which is connected at its lower end 190 to one or more springs 192. Spring 192, for example, may be connected to one channel or edge of the lever arm 188 at one end and may have its other end connected to a bracket 194 carried by a depending boss 196 on the under side of base 20. As shown in Fig. 3, another spring 198 may also be connected to lever arm 188 at one end, and may have its other end fastened to the same bracket 92 which supported one end of the over-center spring mechanism for the bowl-clamping control plate. Springs 192 and 198 normally urge the lower end of bracket or lever 188 toward the front of the mixer and thus tend to rock the motor housing 160 upwardly and rearwardly from the operative position of Fig. 1 toward retracted position. The parts are held in the operating position of Fig. 1 by the engagement of latching hook 122 with latching projection 172.

Adjustable stop means are provided between the movable housing 160 and pedestal 104 in order to limit the movement of the housing toward the bowl support. In this case, the stop means includes a member 200 which is adjustably threaded in a boss 202 in the movable housing 160. The threaded bolt 200 includes a lower head 204 which engages the upper edge 206 of front wall 106 of pedestal 104 to limit clockwise rotation of the housing with respect to the pedestal as shown in Fig. 1. Above the boss 202 the stop member 200 may be provided with a lock nut 208. Relative adjustment of the stop member 200 will thus accordingly serve as an absolute limit for movement of the housing toward operative position. By suitable adjustment of member 200, engagement of the beater 210 supported by the movable housing against the surface of mixing bowl 34 may be prevented. At the same time, the working clearance of the beater 210 above the lower surface of the bowl 34 may be readily adjusted by vertical adjustment of the latch pivot 118 in the manner previously described. Since springs 192 and 198 at all times urge the housing 160 in a counterclockwise direction as viewed in Fig. 1, upward adjustment of the pivot point 118 for latch 116 will obviously raise the beater 210 slightly above the bottom of the bowl and vice versa. Thus the relative adjustments provided for the latch support 120, in cooperation with the adjustable stop member 200, make it possible to control absolutely the exact location of the beater parts with respect to the bowl, so that accidental engagement of the beater against the bowl is prevented and so that the proper working clearance is established between the beater and the bowl.

In order to limit the upward movement of the housing 160 to retracted position, a stop chain 212 is provided. On end of this chain is fastened at 214 to a bracket at the lower rear end of base 20, while the other end of chain 212 is connected to a bracket 216 on the motor 180. The length of chain 212 is normally so adjusted that the housing 160 will tilt upwardly just far enough to lift the beater 210 to the upper portion of the mixing bowl. At the same time the chain is so adjusted that the front skirt 170 of the housing will still overlap slightly the upper edge 206 of the pedestal 104 so that the internal mechanism of the mixer is not exposed at this point. When chain 212 is released, or disconnected, the housing may then be tilted further to the position of Fig. 4 for convenience in assembly of certain portions of the device.

In order to assist in controlling the movement of the housing between operating and retracted positions, a suitable retarding member or brake 218 is provided. In the form shown in Fig. 4, the retarding member 218 is in the form of a ball which is seated in a circular opening 220 in the side wall 112 of pedestal 104. A flat spring 222 is riveted at 224 to the inner side of pedestal wall 112 and urges the ball 218 outwardly against the inner surface of side wall 168 of the movable housing 160. This frictional engagement between the ball 218 and the overlapping wall portion 168 of the housing tends to resist relative movement between the parts and thus cushions the movement of the housing in both directions, particularly the movement toward retracted position under the influence of springs 192 and 198. The inner surface of overlapping side wall 168 may be provided with one or more recesses 226 and 228 into which the ball 218 may snap to assist in determining the operative and retracted positions of the housing.

Extending longitudinally and forwardly from the upper portion of the movable motor housing 160 is a beater-supporting gear casing 230. This casing extends to a point above the bowl support 26 and supports a vertical power shaft 232 above the bowl support. Shaft 232 includes a slot or other driving connection 234 at its upper end to which an operating accessory may be attached. The power shaft 232 is supported by a thrust bearing 236 in the end of casing 230.

At the lower end of power shaft 232 is a planetary head 238 which is keyed to the shaft by a shear pin 239. A beater drive 240 is rotatable on a vertical axis offset from the power shaft axis 232 in the planetary head 238. This beater drive shaft 240 is adapted for removable engagement with the shaft 242 of beater 210, suitable clamping means 244 being provided to hold the beater 210 in position with the beater shaft in interlocking engagement with the drive shaft 240 in known manner.

A pinion 246 at the upper end of beater drive shaft 240 engages an internal ring gear 248 in the end of gear casing 230 and causes rotation of the beater drive shaft and beater on its own axis at the same time that the beater shaft revolves around the axis of power shaft 232 as a result of movement of planetary head 238.

In order to connect the power shaft 232 to the motor shaft 184, suitable driving connections are located in the upper portion of the housing and casing. Power shaft 232 includes a worm bear 250 which is driven by a worm 252 (Fig. 7) journaled in the outer end of the gear casing 230. Journaled in the housing is another worm gear 256 whose axis of rotation is in substantial alignment with that of worm 252. A flexible shaft 254 provides a driving connection between worm gear 256 and worm 252. The gear 256 in turn is driven directly from a pinion 258 on the motor shaft 184.

It will be noted that both the motor housing 160 and gear casing 230 are of substantially open-topped construction. A cover 260 is removably mounted on the casing and housing to close the openings at the top thereof. Cover 260 in turn has an opening 262 through which the upper end of power shaft 232 is accessible for driving engagement with a desired accessory.

Figure 7:
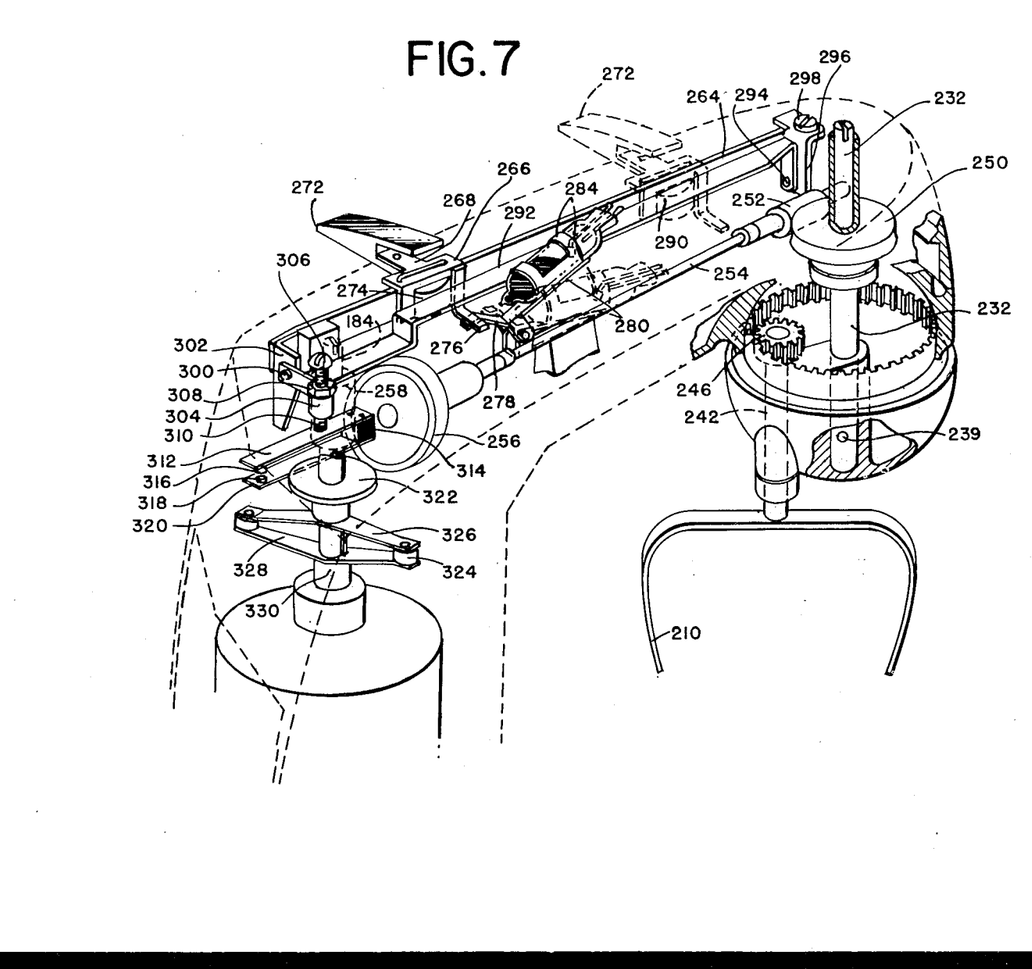
Fig. 7 is a schematic rear perspective view showing details of the governor control mechanism and driving connections in a mixer of Fig. 1.
Figure 8:
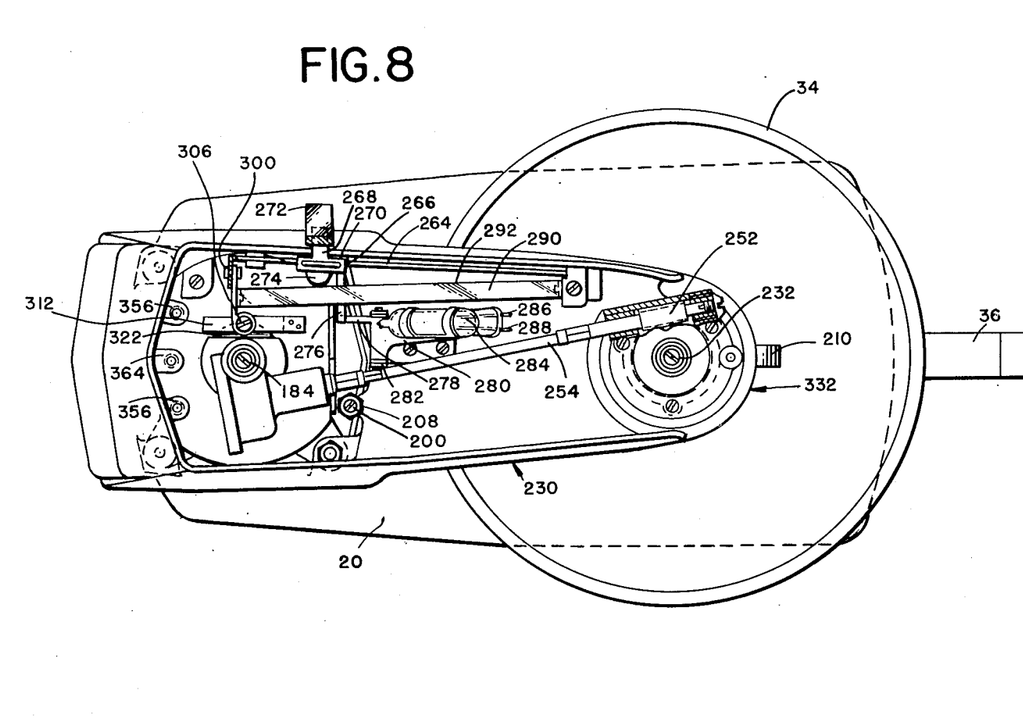
Fig. 8 is a top view of the mixer with the cover removed, showing details of the governor control mechanism.
Figures 9, 10, 11, 12:
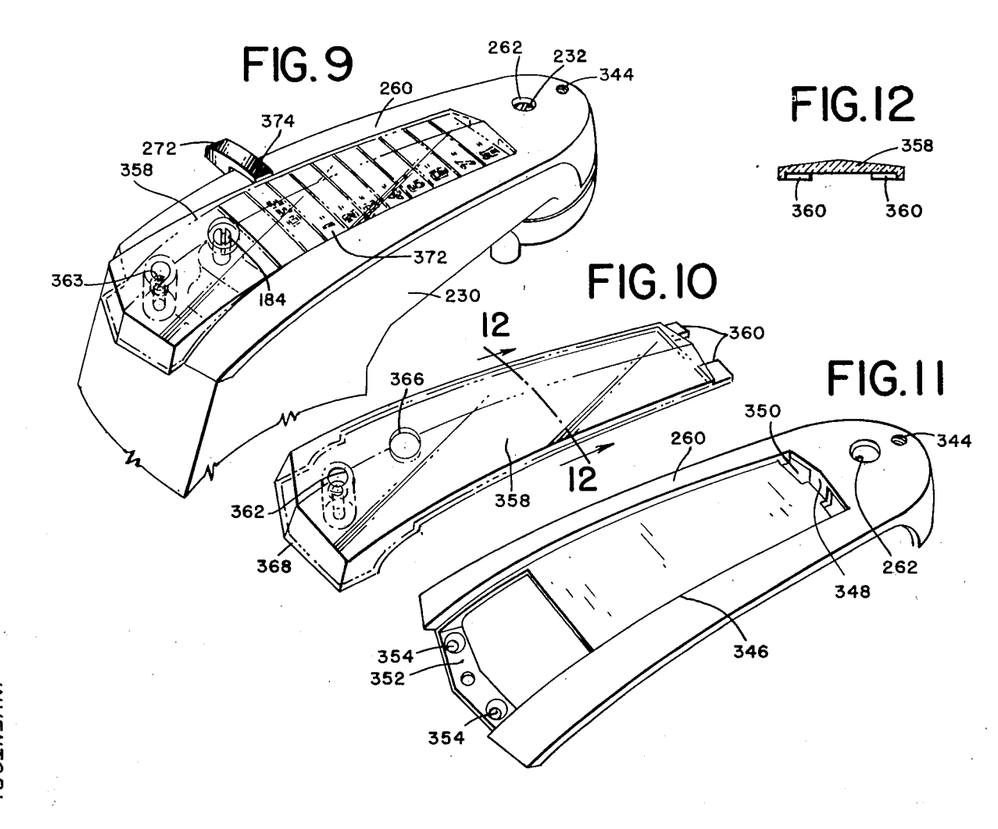
Fig. 9 is a perspective view of the top of the mixer showing the assembled cover in position.
Fig. 10 is a perspective view of the removable insert for the cover.
Fig. 11 is a perspective view of the removable cover itself, without the insert.
Fig. 12 is a sectional view of the insert on the line 12—12 of Fig. 10.

Also mounted in the casing 230 is suitable controlling mechanism for the governor or speed control device of the motor. A longitudinally extending support or slide 264 extends substantially the length of the casing 230 and serves as a slidable support for a control member 266 (Figs. 7 and 8). Control member 266 is slidable longitudinally of the casing on support 264 and includes a projecting arm 268 which extends outwardly through a slot 270 at the meeting line of the casing 230 and cover 260. A manual knob 272 is mounted on the outer end of extension 268 for convenient manipulation by the user. Thus longitudinal movement of knob 272 along the side of casing 230 will cause the control member 266 to slide longitudinally along support 264. Control member 266 includes a speed control cam surface 274 and an on-off lever extension 276. The projection or extension 276 is adapted to engage the actuating arm 278 of a switch support 280 pivoted on a horizontal axis at 282 for tilting movement within the casing. A liquid contact switch 284 is mounted on the switch support 280 and includes leads 286 and 288 connected in the motor circuit in known manner to open and close the circuit depending on the angular position of the liquid contact switch 284. With the manual knob in the position shown in Fig. 8, the extension 276 engages the on-off switch arm 278 and rocks the liquid contact switch 284 to its off position. As soon as the control knob 272 is moved toward the front of the mixer a slight distance, the arm 276 will be disengaged from the lever arm 278 and will permit the switch 284 to rock to its on position, provided the casing and housing are in the operative position of Fig. 1. It will be understood, that in case the housing 160 and casing 230 have been tilted upwardly to their retracted position, the liquid contact switch 284 will be inclined to its off position so that the motor circuit will be broken, even though manual knob 272 is at the forward end of its slide where the motor would normally be in operation.

A speed control member 290 also extends substantially longitudinally of casing 230 and includes a cam or actuating surface 292 which is angularly disposed with respect to the path of movement of control member 266 on slide 264. Speed control member 290 is pivoted at its front end 294 to a depending bracket 296 on the supporting slide for control member 266. This slide support is fastened at 298 to the forward end of the casing 230.

Similarly, the rear end of the speed control lever 290 is pivoted at 300 to another bracket 302 on supporting slide 264. Pivots 300 and 294 are of course in substantial alignment and constitute a pivotal axis for the member 290 which extends substantially longitudinally of the casing 230.

The control member 290 includes a boss 304 in which a bolt 306 is adjustably mounted. A lock nut 308 serves to retain the bolt 306 in its adjusted position. The lower end of the adjustable bolt 306 is provided with an insulating button 310 for engagement with one of the spring contact arms 312. Spring contact arm 312 is mounted on an insulating support 314 on either the motor 80 or housing 160. The switch arm 312 is resiliently biased upwardly so that its position at any time will be determined by the location of the insulating button 310. This location in turn is determined by the position to which the speed control lever 290 has been tilted about its longitudinal axis. This angular position of lever 290 in turn is controlled by the interengagement between the cam portion 274 on the control member 268, and the angularly disposed cam surface 292 of lever 290. As the control knob 272 is moved toward the forward end of the casing 230, the lever 290 will gradually be rocked in a direction such that the switch arm 312 will be depressed to a lower and lower position.

Switch arm 312 carries a contact 316 cooperating with another contact 318 on the movable switch arm 320. The position of switch arm 320 in turn is controlled by the engagement of a collar 322 which is actually slidable on motor shaft 184 in response to variations in the speed of the shaft in known manner. Thus the slidable collar 322 may be connected to governor weights 324 by radial springs 326. The governor weights 324 in turn are connected by other radial springs 328 to an axially stationary collar 330 on the motor shaft. Thus as the speed of rotation of the shaft increases, the collar 322 will be drawn downwardly as the weights 324 are forced outwardly. This downward movement of collar 322 will ultimately move the switch arm 320 downwardly to break the motor circuit at the contacts 316 and 318 in response to a predetermined speed of rotation of the motor shaft. As will be readily understood, the particular speed of operation can thus be determined by the setting of the control knob 272 longitudinally of the casing 230. Since any desired governor mechanism may be utilized in the mixer of the present invention, the governor switch and governor weights and associated parts have been shown schematically purely for purposes of illustration. However, the particular location and arrangement of the control member 266 and speed control lever 290 in the projecting casing 230 of the motor housing 160 constitute an important part of the invention. It will be understood that the governor contacts 316 and 318 are connected in the motor circuit in known manner to control its speed as desired.

With reference to the cover 260, novel means of attachment of the cover to the casing have been provided. In this case the forward end of the cover includes a substantially thickened portion 332 provided with an opening 334 in substantial alignment with a threaded attaching opening 336 in an attachment boss 338 at the outer end of casing 230. An attaching bolt 340 projects downwardly through the cover opening 334 and is threaded into the recess 336 of boss 338 to retain the cover in position. According to the invention, the outer or upper portion of the passage 334 is substantially countersunk or recessed as shown at 342 in order that the head of bolt 340 will be located substantially below the upper surface of cover 260. This countersunk portion 342 is then provided with means for attachment of a suitable accessory to the mixer casing. In this case the particular attaching means includes internal threads 344 in the countersunk portion 342. It will be noted that this countersunk portion is located substantially adjacent the power shaft 232 so that an accessory to be driven by power shaft 232 may readily be held in position by the use of a clamp threaded into the countersunk portion 342.

The cover 260, which is removably mounted on the open-topped housing and casing, includes a longitudinal recess 346, the front edge 348 of which is located just to the rear of the accessory drive opening 262. At the forward edge 348 of recess 346 openings or undercut portions 350 are provided for interfitting engagement with suitable projections on a removable insert described below. The forward end of cover 260 will, of course, be fastened to the casing by the retaining bolt 340 already described. At the rear end of the cover 260 the cross piece 352 is provided with openings 354 through which suitable bolts may be threaded into the attachment bosses 356 (Fig. 8) of the rear wall of the motor housing 160. It will be noted that these openings 354 and the cross piece 352 are substantially below the upper surface of cover 260 so that they may be covered and concealed by the additional removable insert 358 which is mounted in the longitudinal recess 346. This removable insert 358 is preferably of plastic material and includes at its front end projections 360 adapted to interlock with the undercut portions 350 of the cover 260 to retain the forward end of the plastic insert 358 in position. An opening 362 at the rear of the plastic insert provides means for passage of an attaching bolt which may be threaded into the attachment boss 364 in the rear wall of motor housing 160. The removable insert 358 also includes an opening 366 in substantial alignment with the motor shaft so that the motor shaft is accessible through opening 366 for driving engagement with a suitable accessory.

The rear end of the insert 358 extends outwardly at 368 beyond the rear wall of the motor housing 160 in order to provide a handgrip portion by which the mixer may be moved from place to place. This projecting portion 368 also protects and conceals a ventilation opening 370 (Fig. 1) through which air may be introduced into the motor casing for ultimate discharge through the ventilation opening at the lower edge of the base 20.

A suitable scale 372 may be etched on the plastic insert 358 or provided on a separate scale member mounted in the recess 346 beneath the insert. Scale 372 cooperates with a suitable pointer 374 on control knob 272 to indicate the operative condition of the mixer and governor mechanism.

According to the foregoing description, a mixer construction has been provided which offers definite advantages in simplicity, ease of operation, and adaptability to various types of attachments. The mixer includes novel features of construction and improved methods of adjustment which facilitate large scale production of such an item by assembly line methods. The mixer accomplished the objects set forth at the beginning of the present specification and provides a new and improved utensil for performance of a large number of household functions in a more efficient manner.

Since minor variations and changes in the exact details of construction will be apparent to persons skilled in this field, it is intended that this invention shall cover all such changes and modifications as fall within the spirit and scope of the attached claims.

Now, therefore, I claim:

1. A food mixer comprising a base, a bowl support at one end of the base, a beater supporting housing mounted at the other end of the base for movement between operative and retracted positions with respect to the bowl support, means normally urging the housing from operative to retracted position, and a releasable latch including cooperating latch members on the base and housing for holding the housing in operative position, and means for adjustment of one of the cooperating latch members to vary the operative position in which the housing is held by the latch.

2. A food mixer comprising a base, a bowl support at one end of the base, a beater supporting housing mounted at the other end of the base for movement between operative and retracted positions with respect to the bowl support, resilient means normally urging the housing from operative to retracted position, and a releasable latch including cooperating latch members on the base and housing for holding the housing in operative position, and means for adjustment of one of the cooperating latch members to vary the operative position in which the housing is held by the latch against the urging of said resilient means.

3. A food mixer comprising a base, a bowl support at one end of the base, a beater supporting housing mounted at the other end of the base for movement along a given path between operative and retracted positions with respect to the bowl support, means normally urging the housing from operative to retracted position, releasable latch means holding the housing in its operative position, and means supporting said latch means for adjustment along said path to vary said operative position with respect to the bowl support.

4. A food mixer according to claim 3 in which said latch means is supported for adjustment both along said path and transversely thereof.

5. A food mixer comprising a base, a bowl support at one end of the base, a beater supporting housing mounted at the other end of the base for movement along a given path between operative and retracted positions with respect to the bowl support, means normally urging the housing to retracted position, stop means limiting the movement of the housing toward the bowl support along said path, releasable latch means holding the housing in its operative position, and means supporting at least one of said stop means and latch means for adjustment both along said path and transversely thereof.

6. A food mixer comprising a base, a bowl support at one end of the base, a beater supporting housing mounted at the other end of the base for movement along a given path between operative and retracted positions with respect to the bowl support, means normally urging the housing to retracted position, stop means limiting the movement of the housing toward the bowl support along said path, releasable latch means holding the housing in its operative position, and means supporting both said stop means and said latch means for adjustment along said path.

7. A food mixer according to claim 6 in which the stop means and latch means are independently adjustable along said path.

8. A food mixer comprising a base, a bowl support at the front of the base, a stationary hollow pedestal at the rear of the base, an upright housing having a beater supporting casing projecting above the bowl support, the housing being pivoted to the pedestal for tilting on a predetermined axis between operating and retracted positions with respect to the bowl support, the pedestal having a front wall with a latch opening therethrough, and a first latch member inside the pedestal opposite the latch opening, and the housing having a skirt externally overlapping the front pedestal wall, and having a second latch member engaging the first latch through the opening to hold the housing in operating position and manually operable means disengaging the latch members for movement of the housing to retracted position.

9. A food mixer according to claim 8 in which said predetermined axis is horizontal, is located at the rear of the pedestal, and extends transversely of the base.

10. A food mixer according to claim 9 in which the axis is higher than the latch opening above the base.

11. A food mixer comprising a base member, a bowl support at one end of the base, a beater supporting member housing mounted at the other end of the base member for movement along a given path between operating and retracted positions with respect to the bowl support, and releasable latch means holding the housing member in operating position, the latch means including a supporting seat on one of said base and housing members and a latch support mounted on the seat, the seat having a fulcrum engaging one part of the latch support and adjustable fastening means engaging another part of the latch support for rocking adjustment of the support on said fulcrum.

12. A food mixer according to claim 11 in which the seat includes adjustable bolts at each side of the fulcrum, and the latch support has slots through which the bolts project, the slots permitting sliding adjustment of the latch support and the fulcrum permitting pivotal adjustment thereof.

13. A food mixer comprising a base, a bowl support at one end of the base, and a beater-supporting housing at the other end of the base, the bowl support having a plurality of clamps radially slidable with respect to the center of the support, and a control plate rotatably mounted with respect to said center, the plate having a handle portion for rotation of the plate between first and second positions, and interengaging cam portions on the clamps and the plate for movement of the clamps between respective bowl-clamping and bowl-releasing positions in response to movement of the handle between said first and second positions.

14. A food mixer according to claim 13 including resilient means urging the control plate and handle toward bowl-clamping position.

15. A food mixer according to claim 13, including overcenter spring means holding the control plate in whichever of said first and second positions it is placed by the operator.

16. A food mixer according to claim 13, in which the bottom of the bowl support has radial grooves in which the clamps are mounted, the clamps have projecting pins thereon, and the control plate overlies the clamps and has angular cam slots into which the pins project.

17. A food mixer according to claim 16 having a single fastening member passing through the center of the control plate into the bottom of the bowl support and holding the parts in assembled position.

18. A food mixer comprising a base, a bowl support at one end of the base, a beater-supporting housing mounted at the other end of the base for movement between operating and retracted positions with respect to the bowl support, a latch movably mounted on the base for movement between a first position in which the latch holds the housing in operating position and a second position in which the housing is released for movement to retracted position, bowl-clamping means at the bowl support including a control plate rotatably mounted for movement between bowl-clamping and bowl-releasing positions, and a link having one portion connected to the control plate and another portion connected to the latch for movement of the latch from first to second position in response to movement of the plate from clamping to releasing position.

19. A food mixer according to claim 18 in which the link is eccentrically pivoted to the control plate.

20. A food mixer according to claim 18 in which the underside of the base is provided with radial grooves beneath the bowl support and bowl clamps radially slidable in the grooves and having bowl-engaging hooks projecting through the base above the support and operating pins projecting below the clamps, the control plate being pivoted on a vertical axis at the center of the radial grooves overlying the clamps and having circumferential cam slots into which the clamp pins project and an eccentric opening, the link having a pin projecting into the eccentric opening.

21. A food mixer according to claim 20 in which the underside of the base has another groove in which the link is slidably retained between the base and clamping plate.

22. A food mixer comprising a base, a stationary hollow pedestal at one end of the base having a side wall, a beater-supporting housing pivoted to the pedestal on a transverse horizontal axis for tilting movement between operating and retracted positions with respect to the other end of the base, the housing having a side wall overlapping the pedestal side wall, and interengaging means between the overlapping side walls retarding movement of the housing between said positions.

23. A food mixer according to claim 22 in which one of the side walls has an opening at a point overlapped by the other wall in both said positions, the interengaging means comprising a brake member projecting through the opening and frictionally engaging the overlapping wall, and means resiliently urging the brake member against said wall.

24. A food mixer according to claim 23 in which the brake member is a ball seated in the opening and the resilient means includes a leaf spring fastened to the wall adjacent the opening and extending across the opening opposite the overlapping wall.

25. A food mixer according to claim 23 in which the overlapping wall has a recess into which the brake member projects to determine at least one of said housing positions.

26. A food mixer comprising a base, an upright hollow housing at one end of the base having a longitudinally projecting beater-supporting casing extending above the other end of the base, a motor mounted in the housing with the motor shaft substantially vertical, governor means mounted on the motor shaft in the housing, and governor control means mounted in the casing and including an external control member mounted for sliding movement along a path longitudinally of the casing.

27. A food mixer according to claim 26 in which the governor control means also includes an operating lever extending longitudinally of the casing and pivoted on a longitudinal axis angularly disposed with respect to said path, the external control member and lever having interengaging cam portions rocking the lever on its axis in response to sliding movement of the member, and means on the lever operatively connected to the governor means for setting the operating conditions of the latter.

28. A food mixer comprising a casing, speed control means within the casing, an external control member mounted for sliding movement along a path longitudinally of the casing, and an operating lever also extending longitudinally of the casing and pivoted on a longitudinal axis angularly disposed with respect to said path, the control member and lever having interengaging portions rocking the lever on its axis in response to sliding movement of the member, and means operatively connecting the lever to the speed control means.

WALTER VAN GUILDER.

REFERENCES CITED

The following references are of record in the file of this patent:

UNITED STATES PATENTS

| Number | Name | Date |
| --- | --- | --- |
| 1,882,127 | Emmons | Oct. 11, 1923 |
| 1,977,419 | Adams et al. | Oct. 16, 1934 |
| 2,046,784 | Krause | July 7, 1936 |
| 2,131,290 | Kochner et al. | Sept. 27, 1938 |
| 2,184,669 | Hansen | Dec. 26, 1939 |
| 2,270,980 | Tidbal | Jan. 27, 1942 |
| 2,292,566 | Jordan | Aug. 11, 1942 |
| 2,306,245 | Duke | Dec. 22, 1942 |